C. C. VAN DYKE.
ROPE TYING DEVICE.
APPLICATION FILED JUNE 16, 1913.

1,155,976.

Patented Oct. 5, 1915.

Witnesses
Chas. E. Kemper
H. S. J. Dunbar

Inventor
Carl C. Van Dyke.
Percy H. Moore
Attorney

UNITED STATES PATENT OFFICE.

CARL C. VAN DYKE, OF ST. PAUL, MINNESOTA.

ROPE-TYING DEVICE.

1,155,976.  Specification of Letters Patent.  Patented Oct. 5, 1915.

Application filed June 16, 1913. Serial No. 773,905.

*To all whom it may concern:*

Be it known that I, CARL C. VAN DYKE, a citizen of the United States of America, residing at St. Paul, in the county of Ramsey and State of Minnesota, have invented certain new and useful Improvements in Rope-Tying Devices, of which the following is a specification.

My invention relates to rope tying devices and has for its object to provide a simple economical device to which the free end of a string, rope or the like may be quickly and securely attached.

My invention is particularly adapted for use in connecting a clothes line to a post or other support, but it will be understood that I do not limit myself to any specific use.

Figure 1:
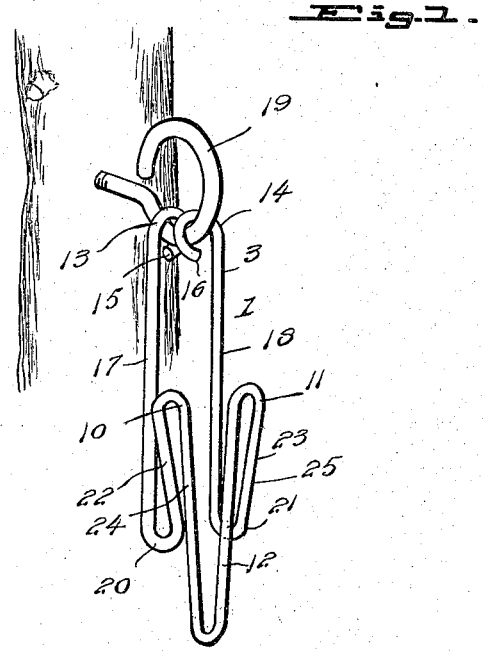
Figure 2:
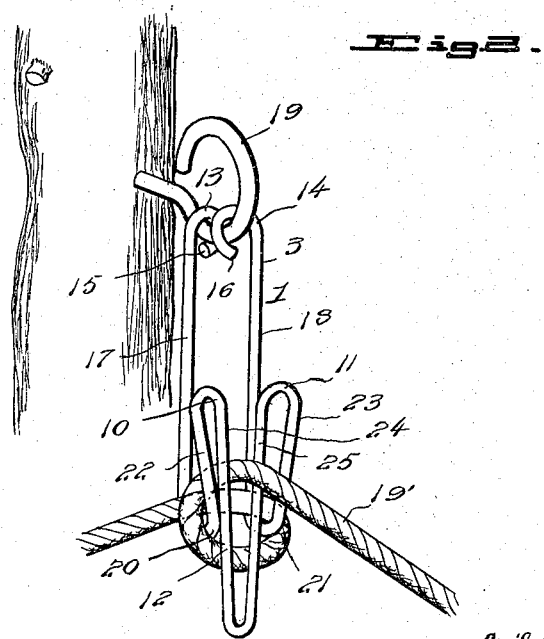

In the accompanying drawing, Figure 1 is a perspective view of my invention; and Fig. 2 is a view similar to Fig. 1, showing the manner of attaching a rope thereto.

Referring more particularly to the drawings in which like reference numerals refer to corresponding parts 1 represents a hook and clasp member formed from a single piece of spring wire. The member 1 comprises a shank portion 3 terminating at one end in rearwardly extending jaws 10 and 11 spaced from one another; while disposed between the jaws is an oppositely extending V-shaped loop 12. The jaws 10 and 11 and the V-shaped loop are arranged to lie in the same or approximately the same plane; while the loop extends to a point beyond the jaws 10 and 11 so as to form a guide member for the twine or rope and also acts as an aid in the formation of the knot.

At its opposite end, the shank is provided with eyes 13 and 14 whereby the device may be suitably secured to a stationary object.

A suitable fastening device such as the screw eye 19 shown in Fig. 2 connected to the eyes 13 and 14 permits of the hook and clasp member being firmly, but detachably secured to a post, building or the like (not shown).

In practice the free end of the rope 19 is looped around the curved portions 20 and 21 connecting the arms 17 and 18 of the shank with the arms 22 and 23 of the side loops 10 and 11 and then up over one of the side loops and down into the V-shaped loop or jaw 12 where it is tightly clamped. When in this posiiton any strain will draw the portions 20 and 21 together thus causing the common side arms 24 and 25 of the central and side loops to grip the rope with increasing intensity. It will thus be seen that it will be impossible for the free end of the rope to be accidentally drawn through the central loop for the reason that when the rope is drawn taut, the arms of the central loop are caused to automatically grip that portion of the rope inserted therebetween.

Having thus described my invention, what I claim is:

A tying device comprising spaced shank members bent upwardly and horizontally back upon themselves to form jaws, and a connecting portion bent into substantially V-shape and lying in the plane with the jaws, said V-shaped portion being extended out beyond said jaws to form a guide member, the plane of said jaws and V-shaped portion being parallel to the plane of the shank members.

In testimony whereof I affix my signature in presence of two witnesses.

CARL C. VAN DYKE.

Witnesses:
HILDA E. BRENDY,
F. W. VAN DEVANTER.

Copies of this patent may be obtained for five cents each, by addressing the "Commissioner of Patents Washington, D. C."